E. J. BRICKER.
AUTOMATIC AIR BRAKE HOSE COUPLING FOR CARS.
APPLICATION FILED JULY 10, 1911.
1,112,973.
Patented Oct. 6, 1914.
3 SHEETS—SHEET 1.
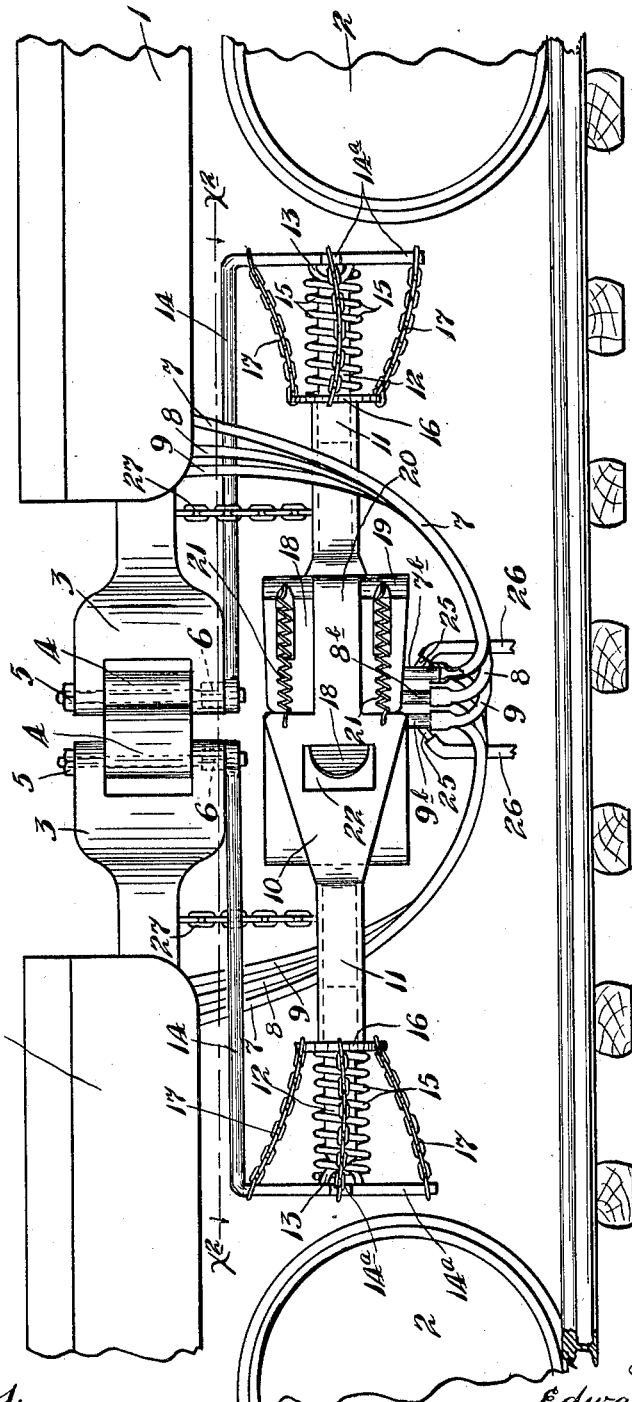
Witnesses.
H. L. Opsahl.
H. A. Hillgren.
Inventor.
Edward J. Bricker.
By his Attorneys

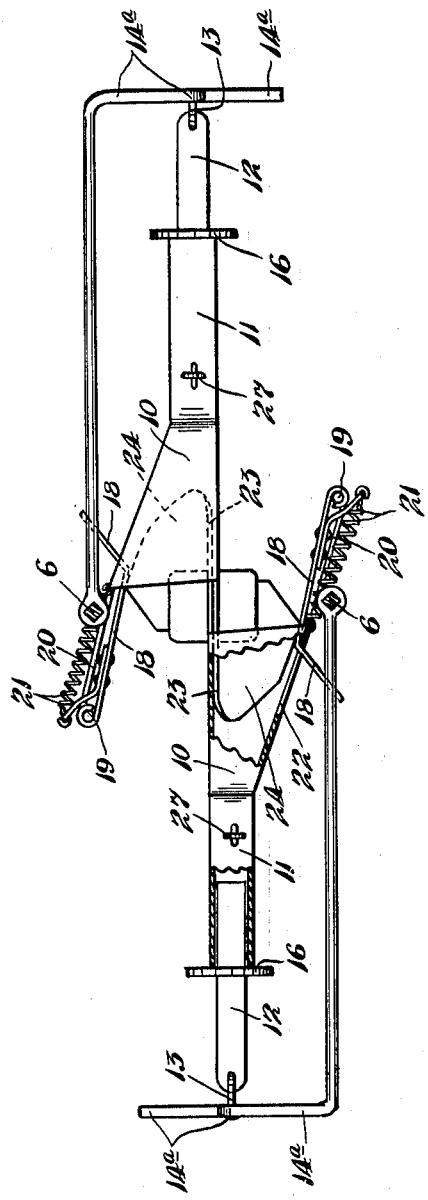

E. J. BRICKER.
AUTOMATIC AIR BRAKE HOSE COUPLING FOR CARS.
APPLICATION FILED JULY 10, 1911.
1,112,973.
Patented Oct. 6, 1914.
3 SHEETS—SHEET 3.
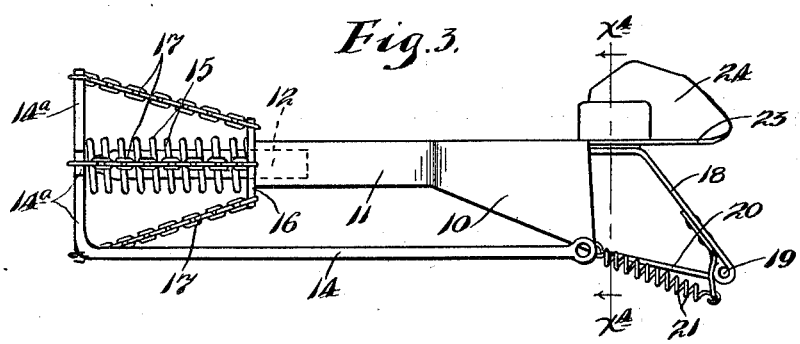
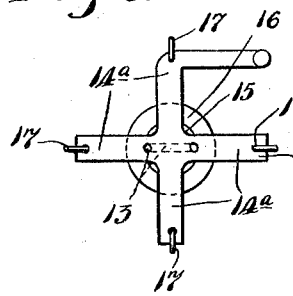
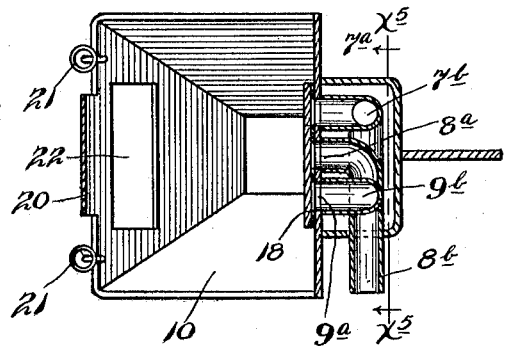
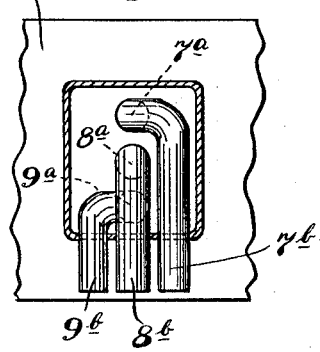
Witnesses.
H. L. Opsahl.
H. A. Hillgren.
Inventor.
Edward J. Bricker
By his Attorneys.
William Muehleisen

UNITED STATES PATENT OFFICE.

EDWARD J. BRICKER, OF MINNEAPOLIS, MINNESOTA, ASSIGNOR OF ONE-HALF TO ORREN E. SAFFORD AND ONE-TENTH TO WILLIAM M. CHOWNING, BOTH OF MINNEAPOLIS, MINNESOTA.

AUTOMATIC AIR-BRAKE HOSE-COUPLING FOR CARS.

1,112,973.  Specification of Letters Patent.  Patented Oct. 6, 1914.

Application filed July 10, 1911.  Serial No. 637,592.

*To all whom it may concern:*

Be it known that I, EDWARD J. BRICKER, a citizen of the United States, residing at Minneapolis, in the county of Hennepin and State of Minnesota, have invented certain new and useful Improvements in an Automatic Air-Brake Hose-Coupler for Cars; and I do hereby declare the following to be a full, clear, and exact description of the invention, such as will enable others skilled in the art to which it appertains to make and use the same.

My present invention has for its object to provide an automatic hose coupler for railway trains, and to such ends the invention consists of the novel devices and combinations of devices hereinafter described and defined in the claims.

Freight trains usually have but one air pipe with flexible hose couplers, while passenger trains usually have three such pipes, one for the air brakes, one for the air actuating signal system, and another for the steam heating system.
My invention provides automatic couplers which will automatically connect the coupling hose of any one or all of these pipe systems.

In the accompanying drawings which illustrate the invention, like characters indicate like parts throughout the several views.

Referring to the drawings, Figure 1 is a view in side elevation with some parts broken away showing the improved automatic hose coupler applied in working position; Fig. 2 is a horizontal section taken approximately on the line $x^2$ $x^2$ of Fig. 1; Fig. 3 is a plan view of one of the coupling devices; Fig. 4 is a vertical section taken on the line $x^4$ $x^4$ of Fig. 3; Fig. 5 is a section taken on the line $x^5$ $x^5$ of Fig. 4; Fig. 6 is an elevation looking at the inner or left hand end portion of the coupler shown in Fig. 3; and Fig. 7 is a fragmentary view in side elevation showing the alining plates or flanges of the hose coupler heads.

The numerals 1, 2 and 3 indicate, respectively, the bodies, the wheels, and the coöperating couplers of an ordinary car, some parts being broken away and some parts being removed, the said parts being of standard or any suitable construction. The car couplers 3 are assumed to be of the Master Car Builders' type, which, as is well known, are mounted for lateral oscillations and are provided with knuckles 4, pivotally connected thereto by pins or bolts 5. For a purpose which will presently appear, the lower end of these bolts or pins 5 are provided with square or angular shanks 6 that fit corresponding recesses in the lower jaws of the coupler heads so that they cannot oscillate or rotate in respect thereto.
The cars illustrated are assumed to be coaches or cars of a passenger train and which are provided with air brake pipes, air signaling pipes, and steam pipes, the same having, respectively, flexible coupling hose 7, 8 and 9.

The hose coupling heads 10 are hollow funnel shaped constructions, preferably rectangular in cross-section and having hollow shanks 11 into which are telescoped supplemental shanks 12. These supplemental shanks 12 are connected by universal hinge joints 13 to the laterally bent ends of supporting arms or brackets 14, shown as afforded with bent rods or bars. At their outer ends, supporting arms 14 have square seats that fit and are rigidly secured to the square shanks 6 of the respective bolts 5 of the car couplers 3. Compression springs 15, are placed around the supplemental shanks 12 and are compressed between the ends of the shanks 11 and the laterally bent ends of the arms 14. At their inner ends, the shanks 11 are provided with flanges 16, to which upper, lower and side chains, or flexible connections 17, are attached. These chains are also diverging and attached to projections 14ª of the supporting arm 14. These chains 17 limit the outward movements of the hose coupler heads 10, under the action of the springs 15 and connect the said hose coupler heads and their shanks to the supporting arm or bracket 14 with freedom for yielding movements both laterally and upward and downward. This adapts the hose coupling heads 10 of two hose couplers to be properly alined or engaged in the hose coupling action. Also, it will be noted that the hose coupling heads are, by their supporting arm 14, carried from and are movable with respect to the car couplers 3, but are capable of yielding movements in respect thereto. The movements of the hose coupling heads in respect to the car coupler heads is important because it always brings the former into position for initial engagement with the coöperating hose coupling head, when two cars are bumped together, and this is especially important when two cars are coupled together on a curve.

Each hose coupling head 10, at one side, is provided with three inwardly opening ports 7ª, 8ª and 9ª, which ports are vertically alined and are normally closed by an overlapping valve 18 which, as shown, is in the form of a valve plate engaged at its outer end at 19 to a projection 20 of the corresponding head 10. A spring 21 connected to a projection of the valve plate 18 and to the corresponding head 10, normally holds the said valve 18 in a position to yieldingly close the coöperating ports above noted. The said ports 7ª, 8ª and 9ª are connected, respectively to short metal pipe sections or stems, 7ᵇ, 8ᵇ and 9ᵇ, to which the coupling hose 7, 8 and 9 are respectively connected. Attention is called to the fact that the said pipes 7ᵇ, 8ᵇ and 9ᵇ are shown as provided with longitudinally spaced ends and that in Fig. 1, the said stems of the one hose coupler lie directly behind those of the other so that only three thereof appear in the said view. The extreme inner or free ends of the valve plate 18 are, as shown, adapted to be pressed or moved laterally through clearance passages 22, formed in the outer side walls of the hose coupler heads 10. To insure proper alinement of the ports 7ª, 8ª and 9ª of the hose coupling heads, each coupling head 10 is provided at its inner side with tapered forwardly projecting and rigidly secured guide plates or flanges 23 and 24, the former of which are vertically disposed and the latter of which are horizontally disposed. The extensible shanks of the hose coupling heads are preferably further supported from the car couplers 3 by short chains or flexible connections 27, which sustain the greater part of the weight of the hose coupling heads. It is important that the ports 7ª, 8ª and 9ª be vertically arranged or spaced, for, if longitudinally spaced, their order would be reversed in the hose couplers of different cars.

The operation is substantially as follows: When two cars are bumped together so as to engage the car couplers 3, the alining flanges 23—24 of one hose coupler will enter the flaring head 10 of the other, and thereby insure accurate alinement of the coöperating ports 7ª, 8ª and 9ª of the two hose couplers. The said tapered alining plates or flanges 23—24 will be forced into close engagement with the walls of the connected coupler head 10 before the car couplers 3 are completely coupled, and hence, the springs 15 will be compressed and will remain compressed as long as the two car couplers 3 are coupled together. When the two hose coupling heads are forced together, the alining flange 24 of the one head engages the valve 18 of the other head and forces the same into an open position and out of the way. This insures the required tight engagement between the faces of the ports 7ª, 8ª and 9ª when the couplers are connected. Whenever the cars are uncoupled, the valves 18 will, of course, automatically and instantly close the respective ports 7ª, 8ª and 9ª, and prevent the said ports from being clogged by snow, ice, or dirt. When the hose coupling heads are connected, they remain rigid, the one in respect to the other, and certain movements incident to irregularities in the road bed, or the vertical movements of the car bodies, or the angular movements in traveling curves, will take place at the universal hinge joints 13. The supplemental shanks 12 are loosely telescoped into the shanks 11 so that they will permit slight movements on the hinges 13 without forcing the coupled hose coupling heads 10 to move in respect to each other. Sometimes, it will be necessary to connect a car having the air brake, signaling and steam pipes with another car, such as a freight car, which has only one pipe, to-wit, an air brake pipe, and has no automatic coupling head. To provide for this the stud pipe or stems 7ᵇ to which the air brake hose 7 is attached, may be provided with a laterally projecting nipple 25, to which an ordinary air brake hose 26 is attached for use when desired. These emergency coupling hose 25 are shown as broken off in Fig. 1, but it will be understood that they will be provided with suitable normally closed valves.

What I claim is:

1. The combination with a car having suitable car couplers and coupling hose for air brake systems, and the like, of automatically engageable hose couplers suspended from said car couplers, the said hose couplers having recessed heads and guide flanges, ports leading from said heads, coupling hose for communication with the said ports, and valves normally closing said ports and extending across the mouths of said recessed heads, the said guide flanges arranged to enter the recessed heads of connected hose couplers, to open said valves and aline the coöperating ports leading therefrom.

2. The combination with a car having suitable car couplers and coupling hose for air brake systems, and the like, of automatically engageable hose couplers suspended from said car couplers, the said hose couplers having recessed heads and guide flanges, a multiplicity of vertically spaced ports opening laterally from said heads, coupling hose for communication with said ports, and spring pressed valves hinged to said heads and extending across the mouths thereof for normally closing said ports, the said guide flanges arranged to enter the recessed heads of connected hose couplers, to open said valves, to aline the coöperating ports of connected heads and for drawing said connected heads laterally together.

3. The combination with a car and a car coupler connected therewith, said car coupler having a pivoted knuckle and a nonrotary knuckle pin connecting said knuckle to the coupler head, of an automatic hose coupling head having a telescopically extensible shank, a bracket connected to said knuckle pin and to which the relatively fixed section of said extensible shank is fulcrumed, a spring applied to said extensible shank tending to project said hose coupling head outward, and a flexible supporting connection between said coupler and said extensible shank, substantially as described.

4. The combination with cars having suitable car couplers, of hose coupling heads supported from said cars and adapted to be automatically engaged, said hose coupling heads having hinged valves yieldingly closed against the air pressure in the said heads and adapted to be automatically opened by a coöperating hose coupling head, when two coupling heads are forced together, the hinged ends of said valves being located outward of their free ends.

In testimony whereof I affix my signature in presence of two witnesses.

EDWARD J. BRICKER.

Witnesses:
HARRY D. KILGORE,
F. D. MERCHANT.

Copies of this patent may be obtained for five cents each, by addressing the "Commissioner of Patents, Washington, D. C."